(12) United States Patent
Nallappan et al.

(10) Patent No.: US 8,396,590 B1
(45) Date of Patent: Mar. 12, 2013

(54) AUTOMATED PAPER CONSUMPTION TRACKING AND AUDITING

(75) Inventors: Ravi Nallappan, Sungai Buloh (MY); Thierry P. R. Supplisson, Cork (IE); Wee Siang Yeap, Kuala Lumpur (MY)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/450,250

(22) Filed: Apr. 18, 2012

Related U.S. Application Data

(63) Continuation of application No. 13/348,765, filed on Jan. 12, 2012.

(51) Int. Cl.
*G06F 17/00* (2006.01)

(52) U.S. Cl. .......................... 700/236; 700/241

(58) Field of Classification Search .................. 358/1.15; 700/233, 236, 241
See application file for complete search history.

(56) References Cited

U.S. PATENT DOCUMENTS

| | | | | |
|---|---|---|---|---|
| 5,446,737 | A * | 8/1995 | Cidon et al. ................... | 370/452 |
| 6,447,184 | B2 * | 9/2002 | Kimura et al. ................. | 400/578 |
| 6,618,566 | B2 * | 9/2003 | Kujirai et al. .................. | 399/79 |
| 6,985,244 | B1 * | 1/2006 | Bhogal et al. ................. | 358/1.15 |
| 7,783,380 | B2 * | 8/2010 | York et al. .................... | 700/240 |
| 7,962,050 | B2 * | 6/2011 | Shustef et al. ................. | 399/8 |
| 8,289,542 | B2 * | 10/2012 | Mukund et al. .............. | 358/1.15 |
| 2007/0162480 | A1 | 7/2007 | Garg et al. | |
| 2010/0079785 | A1 | 4/2010 | Emori et al. | |
| 2010/0322916 | A1 | 12/2010 | McCullough et al. | |

OTHER PUBLICATIONS

"14 Ideas for Reducing Paper Usage in Copiers and Printers," Optimizon Blog, http://www.optimizonblog.com/2009-10-14-ideas-for-reducing-paper-usage-in-copiers-and-printers, accessed Dec. 8, 2011, 4 pages.
"Cut the cost of printing," PaperCut Software International Pty Ltd., http://www.papercut.com, accessed Dec. 8, 2011, 2 pages.
"Lanier—Equitrac Office with Print & Copy Control," Ricoh Americas Corporation, Product Brochure, 2009, 4 pages.
Nallappan et al., "Automated Paper Consumption Tracking and Auditing," U.S. Appl. No. 13/348,765, filed Jan. 12, 2012, 33 pages.

* cited by examiner

*Primary Examiner* — Timothy Waggoner
(74) *Attorney, Agent, or Firm* — Yee & Associates, P.C.; Jeffrey S. LaBaw

(57) ABSTRACT

A method for managing paper consumption. Responsive to dispensing a first amount of paper from a set of paper dispensers in which the first amount of paper is dispensed for an account, the set of paper dispensers updates the account based on the first amount of paper dispensed. Responsive to receiving a second amount of paper at a set of paper disposers in which the second amount of paper is received for the account, the set of disposers updates the account based on the second amount of paper received.

11 Claims, 5 Drawing Sheets

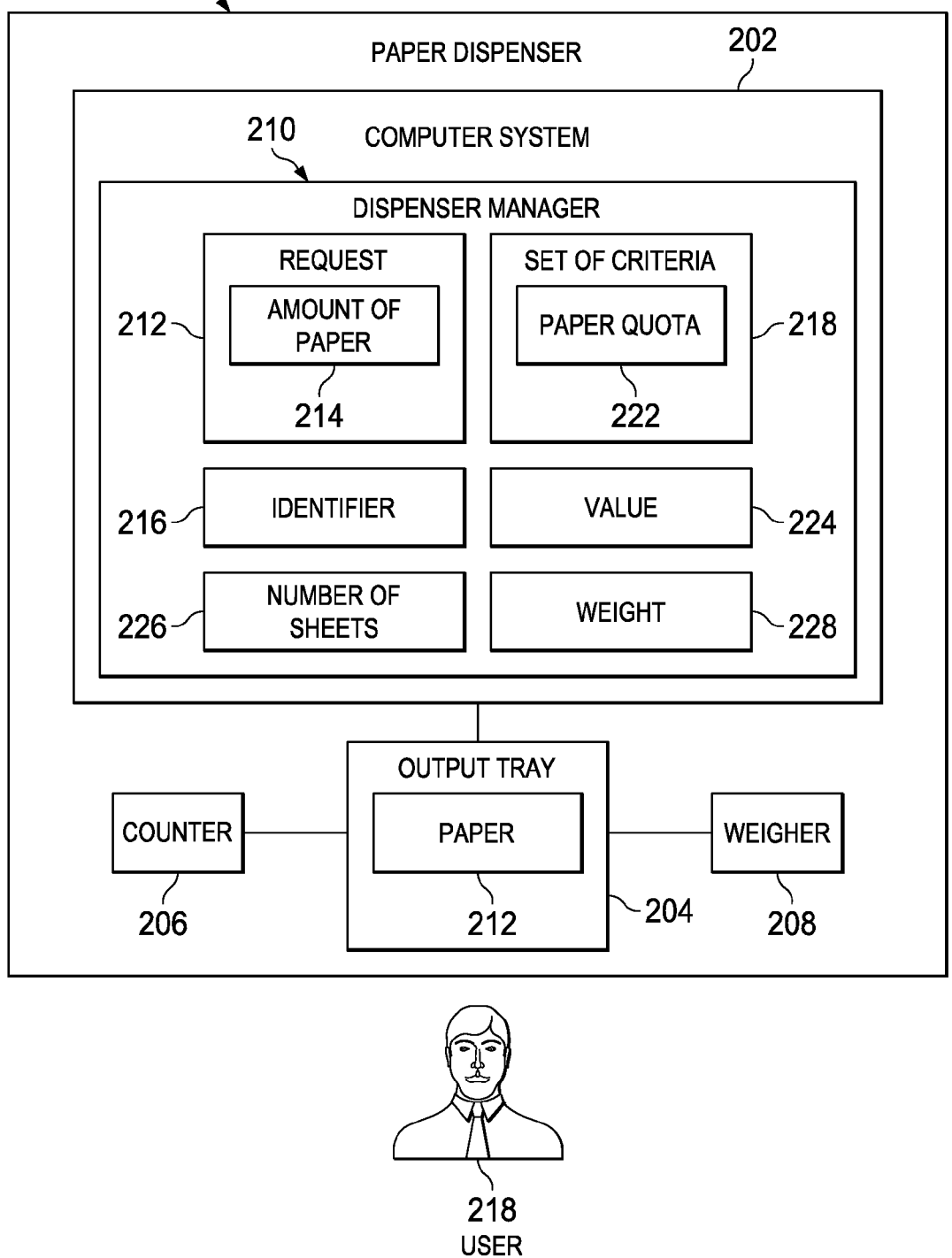

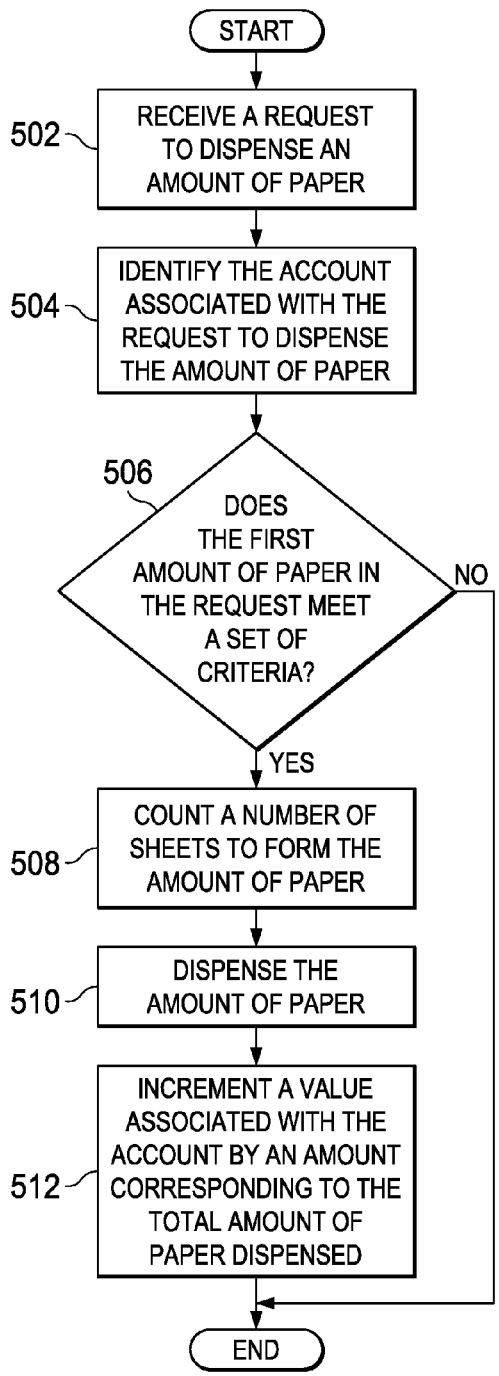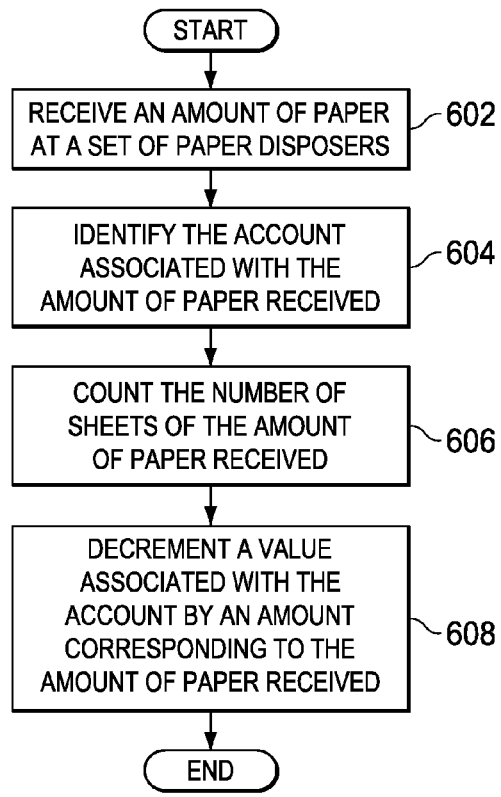

AUTOMATED PAPER CONSUMPTION TRACKING AND AUDITING

This application is a continuation of application Ser. No. 13/348,765, filed Jan. 12, 2012, status pending.

BACKGROUND

1. Field:

The present disclosure relates generally to managing paper consumption and in particular to a method and apparatus for managing the dispensing and disposing of paper. Still more particularly, the present disclosure relates to a method and apparatus for managing the dispensing and disposing of paper, wherein the paper is dispensed and disposed for a particular account.

2. Description of the Related Art

Each year, a large amount of paper is consumed by businesses, government entities, and other organizations. For example, large quantities of paper are used for printing and producing copies.

Many organizations implement recycling programs or encourage recycling. For example, organizations often collect used paper for recycling. Paper recycling leads to a reduction in energy consumption, particulate emissions, wastewater, solid waste, greenhouse gases, and wood use.

However, a large amount of paper is thrown away and not recycled. As a result, much time and energy is used each year in order to produce new paper. Moreover, the production of new paper destroys large numbers of trees and releases greenhouse gases. Today, organizations are looking for effective ways to reduce their impact on the environment.

SUMMARY

The different illustrative embodiments provide a method, apparatus, and computer program product for managing paper consumption. Responsive to dispensing a first amount of paper from a set of paper dispensers in which the first amount of paper is dispensed for an account, the set of paper dispensers updates the account based on the first amount of paper dispensed. Responsive to receiving a second amount of paper at a set of paper disposers in which the second amount of paper is received for the account, the set of disposers updates the account based on the second amount of paper received.

BRIEF DESCRIPTION OF THE SEVERAL VIEWS OF THE DRAWINGS

FIG. 2 is a block diagram of a dispenser accordance with an illustrative embodiment;

FIG. 5 is an illustration of a flowchart of a process for dispensing paper in accordance with an illustrative embodiment;

FIG. 6 is an illustration of a flowchart of a process for disposing paper in accordance with an illustrative embodiment.

DETAILED DESCRIPTION

Figure 1:
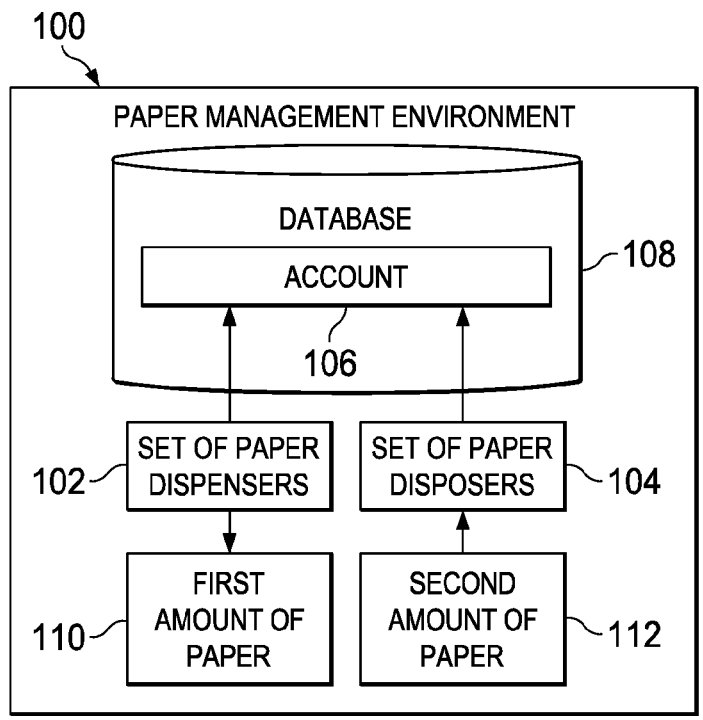
FIG. 1 is an illustration of a paper management environment in which illustrative embodiments may be implemented.

As will be appreciated by one skilled in the art, aspects of the illustrative embodiments may be embodied as a system, method or computer program product. Accordingly, aspects of the illustrative embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the illustrative embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electro-magnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction processing system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction processing system, apparatus, or device.

Program code embodied on a computer readable medium may be transmitted using any appropriate medium, including but not limited to wireless, wireline, optical fiber cable, radio frequency, etc., or any suitable combination of the foregoing.

Computer program code for carrying out operations for aspects of the illustrative embodiments may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the illustrative embodiments are described below with reference to flowchart illustrations and/or block diagrams of methods, apparatus (systems) and computer program products according to illustrative embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which are processed via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which are processed on the computer or other programmable apparatus provide processes for implementing the functions/acts specified in the flowchart and/or block diagram block or blocks.

The different illustrative embodiments recognize and take into that account that each year, a large amount of paper is consumed by organizations and not recycled. The different illustrative embodiments recognize and take into account that organizations are looking for effective ways to reduce their impact on the environment. The different illustrative embodiments recognize and take into account that managing paper consumption in an organization may be desirable.

Thus, the different illustrative embodiments provide method, apparatus, and computer program product for managing paper consumption. Responsive to dispensing a first amount of paper from a set of paper dispensers in which the first amount of paper is dispensed for an account, the set of paper dispensers updates the account based on the first amount of paper dispensed. Responsive to receiving a second amount of paper at a set of paper disposers in which the second amount of paper is received for the account, the set of disposers updates the account based on the second amount of paper received. As used herein, "set of" refers to "one or more." For example, a set of paper dispensers is one or more paper dispensers and a set of paper disposers is one or more paper disposers.

With reference to FIG. 1 paper management environment 100 is depicted in accordance with an illustrative embodiment. As depicted, paper management environment 100 is an example of components in which the illustrative embodiments may be implemented.

In the depicted example, set of paper dispensers 102 comprises one or more paper dispensers. A paper dispenser is a device that dispenses paper. The device may be a printer, copier, or any other device suitable for dispensing paper. The paper dispensed may be any type of paper. For example, paper of different sizes, colors, shapes, and thickness may be dispensed.

In the depicted example, set of paper disposers 104 comprises one or more paper disposers. A paper disposer is a device that disposes paper. The device may be a shredder, bin, or any other device suitable for disposing paper. The paper disposed may be any type of paper. For example, paper of different sizes, colors, shapes, and thickness may be dispensed.

In the depicted example, account 106 comprises stored information. The stored information may be associated with a particular user, a group of users, or an organization. The stored information comprises information associated with set of paper dispensers 102 and set of paper disposers 104. The stored information may be used to manage paper consumption. For example, account 106 may keep track of a total amount of paper dispensed and disposed for account 106. In some illustrative embodiments, account 106 is allocated a maximum amount of paper that can be dispensed. In some illustrative examples, paper that is disposed can be credited towards the amount of paper allocated to account 106 that can be dispensed.

In some illustrative embodiments, account 106 is stored in database 108. In some illustrative embodiments, set of paper dispensers 102 may comprise database 108. In some illustrative embodiments, set of paper disposers 104 may comprise database 108. In some illustrative embodiments, database 108 may be a stand-alone storage unit. In some illustrative embodiments, database 108 may be a component of a computer system. In some illustrative embodiments, set of paper dispensers 102 and set of paper dispensers 104 communicate to account 106 and database 108 via a communications medium. Examples of a communications medium that may be used include a network, wire and wireless transmission of information.

In this illustrative example, responsive to dispensing first amount of paper 110 from set of dispensers 102 in which first amount of paper 110 is dispensed for account 106, set of paper dispensers 102 updates account 106 based on first amount of paper 110 dispensed. For example, responsive to dispensing 10 sheets of paper, the amount of paper allocated to account 106 is decreased by 10 sheets of paper.

In some illustrative embodiments, responsive to dispensing amount of paper 110, a value associated with account 106 is increased by an amount corresponding amount of paper 110 dispensed. For example, a count of paper dispensed and a weight of paper dispensed is increased by an amount corresponding to amount of paper 110 dispensed. In some illustrative embodiments, responsive to receiving and disposing amount of paper 112, a value associated with account 106 is increased by an amount corresponding amount of paper 112 disposed. For example, a count of paper disposed and a weight of paper disposed is increased by an amount corresponding to amount of paper 112 disposed. In some illustrative embodiments, the count of paper dispensed is compared to the count of paper disposed to determine a difference. Similarly, the weight of paper dispensed may be compared to the weight of paper disposed to determine a difference. Responsive to the difference exceeding a quota, set of paper dispensers 102 may prevent dispensing paper for account 106. For example, responsive to determining that the count of paper dispensed is 100 sheets greater than the count of paper disposed for account 106, then set of paper dispensers 102 may prevent dispensing paper for account 106. Thus, a quota may be set, wherein the quota is a threshold value at which set of paper dispensers 102 may prevent dispensing paper for account 106.

In this illustrative example, responsive to receiving second amount of paper 112 from set of disposers 104 in which second amount of paper 112 is disposed for account 106, set of paper disposers 104 updates account 106 based on second amount of paper 112 dispensed. For example, responsive to receiving 10 sheets of paper, the amount of paper allocated to account 106 is increased by 10 sheets of paper. In some illustrative embodiments, the amount of paper allocated to account 106 is increased by a smaller or larger amount of paper than the amount received by set of paper disposers 104. For example, the amount of paper allocated to account 106 may be increased by a percentage of the amount received by set of paper disposers 104. In some illustrative examples, the amount of paper allocated to account 106 is for a specific type of paper, weight of paper, and color of paper. For example, a credit may be allocated to account 106 for an amount of paper of a particular size, weight, color, and use, such as photographic paper.

With reference now to FIG. 2, a block diagram of a paper dispenser 200 is depicted in accordance with an illustrative embodiment. Paper dispenser 200 is an example of a paper dispenser in set of paper dispensers 102 of FIG. 1.

In the depicted example, paper dispenser 200 comprises computer system 202, output tray 204, counter 206, and weigher 208. Output tray 204, counter 206, and weigher 208 are connected to computer system 202 via a communications medium. Computer system 202 is a hardware component in the illustrative examples. Examples of a communications medium that may be used include a network, wire and wireless transmission of information. In the depicted example, computer system 202 may comprise one or more computers, server computers, client computers, personal devices, or any other systems capable of running program code.

In the depicted example, computer system 202 comprises dispenser manager 210. In the depicted example, dispenser manager 210 is a software application running on computer system 202. In some illustrative examples, dispenser manager 210 may be a combination of software and hardware.

In the depicted example, responsive to receiving request 212 to dispense amount of paper 214, identifier 216 identifies account 106 associated with request 212 to dispense amount of paper 214. In some illustrative examples, request 212 is received from user 218. In some illustrative examples, request 212 is received from a computer system, remote user, or any other device and person suitable for generating request 212. In some illustrative examples, amount of paper 214 may comprise a number of sheets of paper associated with request 212. In some illustrative examples, amount of paper 214 may comprise a weight of an amount of paper associated with request 212. In some illustrative examples, request 212 may indicate a sizes, colors, shapes, and thickness of paper to be dispensed.

In some illustrative examples, identifier 216 identifies account 106 based upon identifying user 218 that submitted request 212, wherein user 218 is associated with account 106. Identifier 216 may identify user 218 based on a passcode, voice information, biometric information, photographic information, video information, or any other form of information suitable for identifying user 218. In some illustrative examples, identifier 216 identifies account 106 based upon identifying a passcode, a user and password combination, or any other information that is suitable for being used to identify account 106. Therefore, user 218 is not necessary in order for dispenser manager 210 to receive request 212. Thus, paper dispenser 200 may authenticate user 218. In some illustrative examples, after user 218 is authenticated, user 218 may then receive paper 214 from dispenser.

In the depicted example, dispenser manager 210 determines whether amount of paper 214 meets set of criteria 218. Responsive to dispenser manager 210 determining that amount of paper 214 meets set of criteria 218, paper dispenser 200 dispenses paper 220, which corresponds to the requested amount of paper 212. For example, dispenser manager 210 may determine whether dispensing amount of paper 212 will result in paper quota 222 associated with account 106 being exceeded. If dispensing amount of paper 212 will not result in paper quota 222 being exceeded, then paper dispenser 200 dispenses paper 220. In the depicted example, paper dispenser 200 dispenses paper 220 into output tray 204.

If dispensing amount of paper 212 will result in exceeding paper quota 222, then paper dispenser 200 does not dispense paper 220. In some illustrative embodiments, if dispensing amount of paper 212 will result in exceeding paper quota 222, then paper dispenser 200 dispenses an amount of paper that is less than amount of paper 212 requested. For example, paper dispenser 200 may dispense an amount of paper that causes paper quota 222 to be reached.

In some illustrative examples, paper dispenser 200 dispenses paper 220 into output tray by counting the number of sheets of paper 220 dispensed. For example, counter 206 may count each sheet of paper 204 dispensed into output tray 204 until the number of sheets of paper 220 counted by counter 206 corresponds to amount of paper 212. In some illustrative examples, counter 206 uses a sensor to count the number of sheets of paper 220 dispensed.

When dispenser manager 210 determines that number of sheets of paper 220 counted by counter 206 corresponds to amount of paper 212 based upon information transmitted from the sensor, then dispenser manager 210 causes paper dispenser 200 to stop dispensing paper. For example, a photo sensor, motion sensor, or any other sensor suitable for counting dispensed paper may be used. In some illustrative examples, dispenser manager 210 updates account 106 based on the number of sheets of paper 220 counted by counter 206. For example, dispenser manager 210 may increment value 224 associated with account 106 by an amount corresponding to number of sheets of paper 220 counted by counter 206.

In some illustrative examples, paper dispenser 200 dispenses paper 220 into output tray by weighing sheets of paper 220 dispensed. For example, weigher 208 may weigh sheets of paper 204 dispensed into output tray 204 until the weight of paper 220 weighed by weigher 208 corresponds to amount of paper 212. In some illustrative examples, weigher 208 uses a scale to weigh paper 220.

When dispenser manager 210 determines that weight of paper 220 weighed by weigher 208 corresponds to amount of paper 212 based upon information transmitted from the scale, then dispenser manager 210 causes paper dispenser 200 to stop dispensing paper. For example, a digital scale, analog scale, or any other scale suitable for weighing dispensed paper may be used. In some illustrative examples, dispenser manager 210 updates account 106 based on the number of sheets of paper 220 weighed by weigher 208. For example, dispenser manager 210 may increment value 224 associated with account 106 by an amount corresponding to number of sheets of paper 220 weighed by weigher 208.

In some illustrative examples, dispenser manager 210 may increment value 224 associated with account 106 by an amount corresponding to the weight of paper 220. In the depicted example, number of sheets 226 corresponds to the number of sheets of paper 220 counted by counter 206 and weight 228 corresponds to the weight of paper 220 measured by weigher 208.

Figure 3:
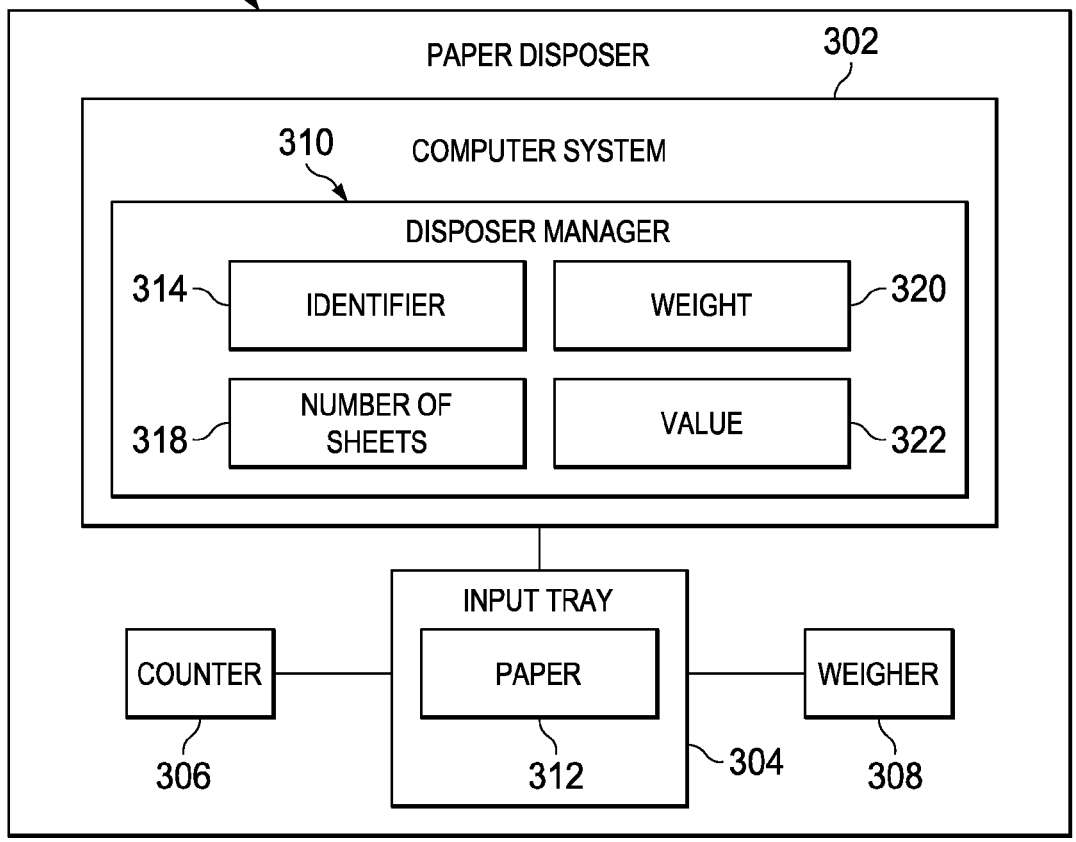
FIG. 3 is a block diagram of a disposer in accordance with an illustrative embodiment.

With reference now to FIG. 3, a block diagram of a paper disposer 300 is depicted in accordance with an illustrative embodiment. Paper disposer 300 is an example of a paper disposer in set of paper disposers 104 of FIG. 1.

In the depicted example, paper disposer 300 comprises computer system 302, input tray 304, counter 306, and weigher 308. Input tray 304, counter 306, and weigher 308 are connected to computer system 302 via a communications medium. Computer system 302 is a hardware component in the illustrative examples. Examples of a communications medium that may be used include a network, wire and wireless transmission of information. In the depicted example, computer system 302 may comprise one or more computers, server computers, client computers, personal devices, or any other systems capable of running program code.

In the depicted example, computer system 302 comprises disposer manager 310. In the depicted example, disposer manager 310 is a software application running on computer system 302. In some illustrative examples, disposer manager 310 may be a combination of software and hardware. In the depicted example, paper 312 is received at input tray 304. Identifier 314 identifies account 106 associated with paper 312 received. In some illustrative examples, paper 312 is received from user 316.

In some illustrative examples, number of sheets 318 comprises a number of sheets of paper 304. Counter 306 may count each sheet of paper 312 received at input tray 204. In some illustrative examples, counter 306 uses a sensor to count number of sheets 318 of paper 312 dispensed. For example, a photo sensor, motion sensor, or any other sensor suitable for counting received paper may be used. In some illustrative examples, disposer manager 310 updates account 106 based on number of sheets 318 of paper 312 counted by counter 306. For example, disposer manager 310 may decrement value 320 associated with account 106 by an amount corresponding to number of sheets 318 of paper 312 counted by counter 306.

In some illustrative examples, weight 320 comprises a weight of paper 312. Weigher 308 may weigh paper 312 received at input tray 304 to form weight 320. In some illustrative examples, weigher 308 uses a scale to weigh paper 312 received. For example, a digital scale, analog scale, or any other scale suitable for weighing dispensed paper may be used. In some illustrative examples, disposer manager 310 updates account 106 based on the number of sheets of paper 312 weighed by weigher 308. For example, disposer manager 310 may decrement value 322 associated with account 106 by an amount corresponding to number of sheets of paper 312 weighed by weigher 308. In some illustrative examples, disposer manager 310 may decrement value 322 associated with account 106 by an amount corresponding to weight 320.

In some illustrative examples, identifier 314 identifies account 106 based upon identifying user 316, wherein user 316 is associated with account 106. Identifier 314 may identify user 316 based on a passcode, voice information, biometric information, photographic information, video information, or any other form of information suitable for identifying user 316. In some illustrative examples, identifier 314 identifies account 106 based upon identifying a passcode, a user and password combination, or any other information that is suitable for being used to identify account 106. Thus, paper disposer 300 may authenticate user 316. In some illustrative examples, after user 316 is authenticated, user 316 may then use paper disposer 300.

In some illustrative examples, an amount of paper dispensed and received for an account over a time period may be stored, for example in database 108. The amount of paper dispensed and received over the time period for the account may be reported. An additional amount of paper dispensed and received for one or more additional accounts over the time period may be stored, for example in database 108. The amount of paper dispensed and received for the one or more additional accounts may be reported. Furthermore, the amount of paper dispensed and received over the time period for the account and the one or more additional accounts may be stored and reported. Reporting may include displaying information on a display or printing information. The time period 122 may be contiguous or non-contiguous. Therefore, paper dispensing and disposing for multiple accounts can be reported. For example, an organization that comprises multiple accounts can generate reports based on each individual account. The data for each account may also be aggregated and summarized to generate a report for the organization.

Figure 4:
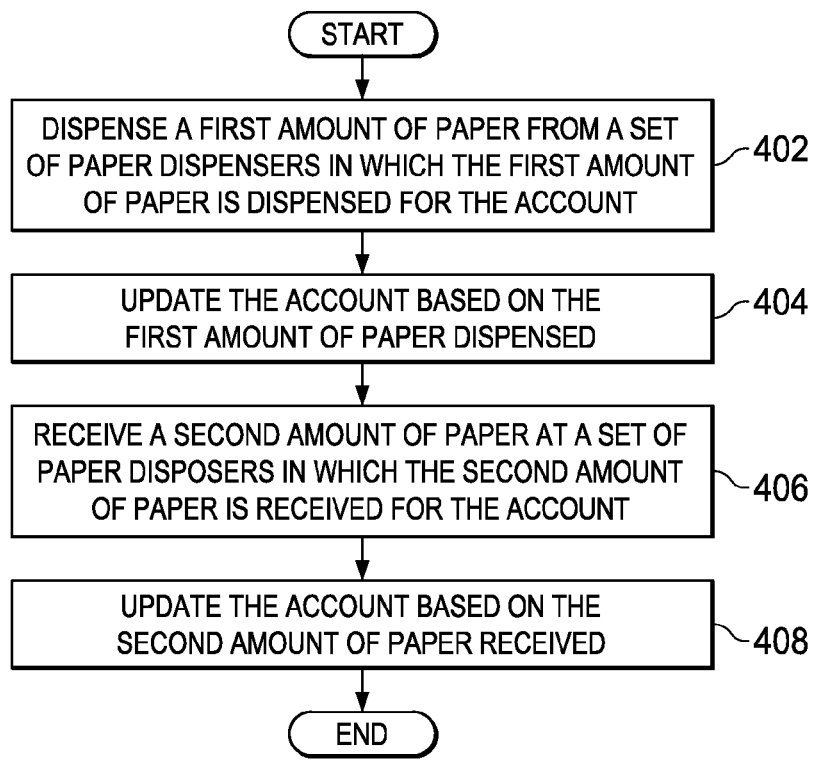
FIG. 4 is an illustration of a flowchart of a process for managing paper consumption in accordance with an illustrative embodiment.

With reference now to FIG. 4, an illustration of a flowchart of a process for managing paper consumption is depicted in accordance with an illustrative embodiment. The process illustrated in FIG. 4 may be implemented by a paper dispenser and paper disposer, such as paper dispenser 200 in FIG. 2 and paper disposer 300 in FIG. 3.

The process begins by dispensing a first amount of paper 220 from a set of paper dispensers 102 in which the first amount of paper 220 is dispensed for an account 106 (step 402). The process then updates the account 106 based on the first amount of paper dispensed (step 404).

The process then receives a second amount of paper 312 at a set of paper disposers 104 in which the second amount of paper 312 is received for the account 106 (step 406). The process then updates the account 106 based on the second amount of paper 312 received (step 408). Thereafter, the process terminates.

With reference now to FIG. 5, an illustration of a flowchart of a process for dispensing paper is depicted in accordance with an illustrative embodiment. The process illustrated in FIG. 5 may be implemented by a paper dispenser, such as paper dispenser 200 in FIG. 2.

The process begins by receiving a request to dispense an amount of paper 212 (step 502). The process then identifies the account 106 associated with the request 212 to dispense the amount of paper 212 (step 504). At step 506, the process determines whether the amount of paper 214 in the request 212 meets a set of criteria (step 506). At step 506, if the amount of paper 214 in the request 212 does not meet the set of criteria, the process terminates.

At step 506, if the amount of paper 214 in the request 212 does meet the set of criteria, the process counts a number of sheets to form the amount of paper 212 (step 508). The process then dispenses the amount of paper 212 (step 510). The process then increments a value 224 associated with the account 106 by an amount corresponding to the total amount of paper 212 dispensed (step 512). Thereafter, the process terminates.

With reference now to FIG. 6, an illustration of a flowchart of a process for disposing paper is depicted in accordance with an illustrative embodiment. The process illustrated in FIG. 6 may be implemented by a paper disposer, such as paper disposer 300 in FIG. 3.

The process begins by receiving an amount of paper 312 at a set of paper disposers (step 602). The process then identifies the account 106 associated with the amount of paper 312 received (step 604). At step 606, the process counts the number of sheets of the amount of paper 312 received (step 606).

At step 608, the process decrements a value 322 associated with the account 106 by an amount corresponding to the amount of paper 312 received. Thereafter, the process terminates.

Figure 7:
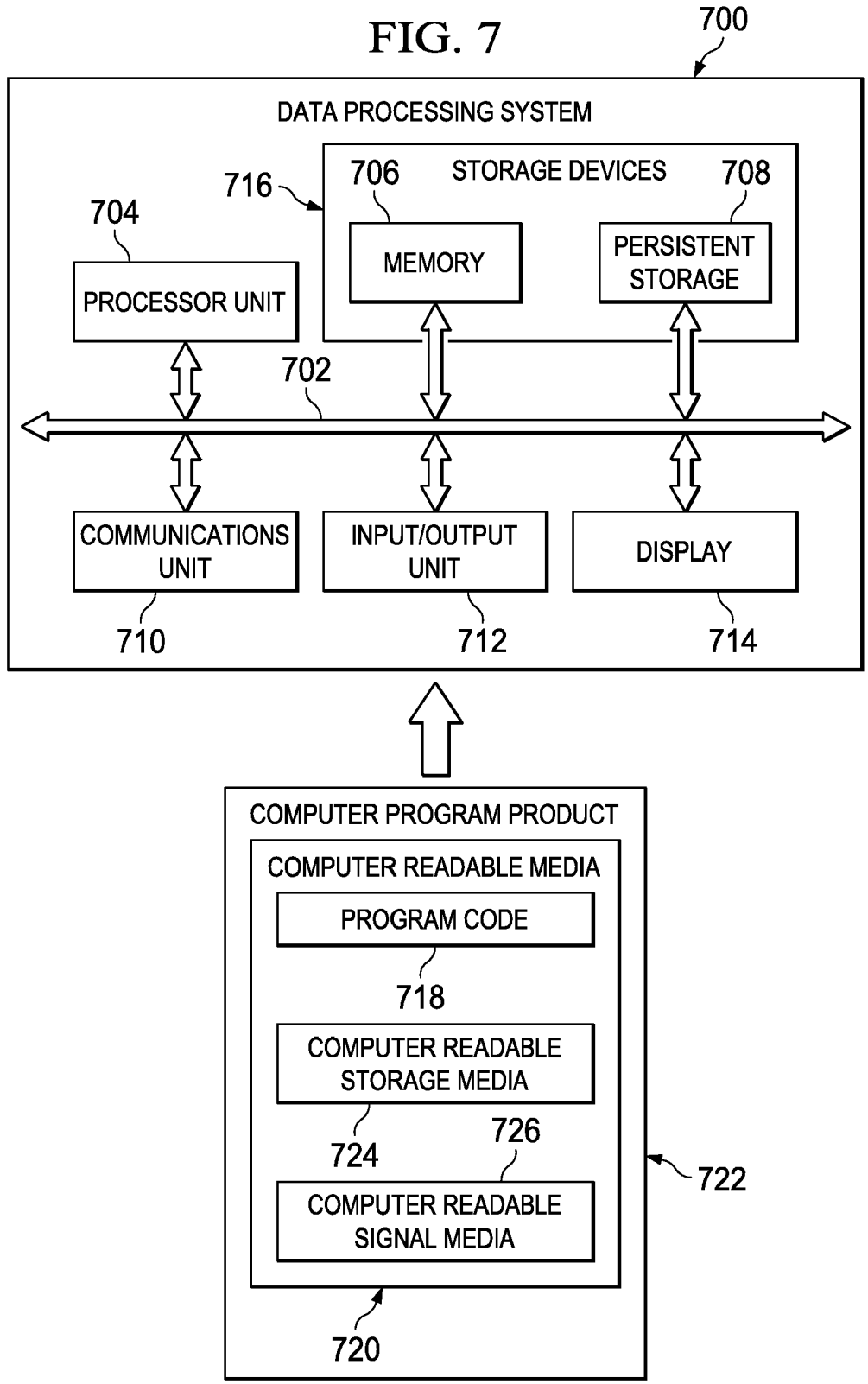
FIG. 7 is an illustration of a data processing system in accordance with an illustrative embodiment.

Turning now to FIG. 7, an illustration of a data processing system is depicted in accordance with an illustrative embodiment. In this illustrative example, data processing system 700 includes communications fabric 702, which provides communications between processor unit 704, memory 706, persistent storage 708, communications unit 710, input/output (I/O) unit 712, and display 714. Data processing system 700 is an example of one implementation for computer system 202 in FIG. 2 and computer system 302 in FIG. 3.

Processor unit 704 serves to run instructions for software that may be loaded into memory 706. Processor unit 704 may be a number of processors, a multi-processor core, or some other type of processor, depending on the particular implementation. A number, as used herein with reference to an item, means one or more items. Further, processor unit 704 may be implemented using a number of heterogeneous processor systems in which a main processor is present with secondary processors on a single chip. As another illustrative example, processor unit 704 may be a symmetric multi-processor system containing multiple processors of the same type.

Memory 706 and persistent storage 708 are examples of storage devices 716. A storage device is any piece of hardware that is capable of storing information, such as, for example, without limitation, data, program code in functional form, and/or other suitable information either on a temporary basis and/or a permanent basis. Storage devices 716 may also be referred to as computer readable storage devices in these examples. Memory 706, in these examples, may be, for example, a random access memory or any other suitable volatile or non-volatile storage device. Persistent storage 608 may take various forms, depending on the particular implementation.

For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708.

Communications unit 710, in these examples, provides for communications with other data processing systems or devices. In these examples, communications unit 710 is a network interface card. Communications unit 710 may provide communications through the use of either or both physical and wireless communications links.

Input/output unit 712 allows for input and output of data with other devices that may be connected to data processing system 700. For example, input/output unit 712 may provide a connection for user input through a keyboard, a mouse, and/or some other suitable input device. Further, input/output unit 712 may send output to a printer. Display 714 provides a mechanism to display information to a user.

Instructions for the operating system, applications, and/or programs may be located in storage devices 716, which are in communication with processor unit 704 through communications fabric 702. In these illustrative examples, the instructions are in a functional form on persistent storage 708. These instructions may be loaded into memory 706 or run by processor unit 704. The processes of the different embodiments may be performed by processor unit 704 using computer implemented instructions, which may be located in a memory, such as memory 706.

These instructions are referred to as program code, computer usable program code, or computer readable program code that may be read and run by a processor in processor unit 704. The program code in the different embodiments may be embodied on different physical or computer readable storage media, such as memory 706 or persistent storage 708.

Program code 718 is located in a functional form on computer readable media 420 that is selectively removable and may be loaded onto or transferred to data processing system 700 and run by processor unit 704. Program code 718 and computer readable media 620 form computer program product 722 in these examples. In one example, computer readable media 720 may be computer readable storage media 724 or computer readable signal media 726. Computer readable storage media 724 may include storage devices, such as, for example, an optical or magnetic disk that is inserted or placed into a drive or other device that is part of persistent storage 708 for transfer onto a storage device, such as a hard drive, that is part of persistent storage 708. Computer readable storage media 724 also may take the form of a persistent storage device, such as a hard drive, a thumb drive, or a flash memory, that is connected to data processing system 700. In some instances, computer readable storage media 724 may not be removable from data processing system 700. In these illustrative examples, computer readable storage media 724 is a non-transitory computer readable storage medium.

Alternatively, program code 718 may be transferred to data processing system 200 using computer readable signal media 726. Computer readable signal media 726 may be, for example, a propagated data signal containing program code 718. For example, computer readable signal media 726 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 718 may be downloaded over a network to persistent storage 708 from another device or data processing system through computer readable signal media 726 for use within data processing system 700. For instance, program code stored in a computer readable storage medium in a server data processing system may be downloaded over a network from the server to data processing system 700. The data processing system providing program code 718 may be a server computer, a client computer, or some other device capable of storing and transmitting program code 718.

Program code 718 may be downloaded over a network from a remote data processing system to computer readable storage media 724 in data processing system 700. Furthermore, data processing system 700 may be a server data processing system, and program code 718 may be downloaded over the network to the remote data processing system for use in another computer readable storage media in the remote data processing system.

The different components illustrated for data processing system 700 are not meant to provide architectural limitations to the manner in which different embodiments may be implemented. The different illustrative embodiments may be implemented in a data processing system including components in addition to or in place of those illustrated for data processing system 700. Other components shown in FIG. 7 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

As another example, a storage device in data processing system 700 is any hardware apparatus that may store data. Memory 706, persistent storage 708, and computer readable media 720 are examples of storage devices in a tangible form.

In another example, a bus system may be used to implement communications fabric 702 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 706, or a cache, such as found in an interface and memory controller hub that may be present in communications fabric 402.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the invention is a method, data processing system, and computer program product for managing paper consumption. Responsive to dispensing a first amount of paper from a set of paper dispensers in which the first amount of paper is dispensed for an account, the set of paper dispensers updates the account based on the first amount of paper dispensed. Responsive to receiving a second amount of paper at a set of paper disposers in which the second amount of paper is received for the account, the set of disposers updates the account based on the second amount of paper received.

One or more of the illustrative embodiments manage paper consumption by keeping track of the amount of paper dispensed and disposed for an account. The account may be associated with an individual user or an organization. The illustrative embodiments may provide an effective process for monitoring paper usage and encouraging paper recycling and reuse. These results may save time, money, and energy required to produce new paper. Furthermore, the environmental impact due to paper consumption may be reduced.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer implemented method for managing paper consumption, the method comprising:
   responsive to dispensing a first amount of paper from a set of paper dispensers in which the first amount of paper is dispensed for an account, updating the account based on the first amount of paper dispensed; and
   responsive to receiving a second amount of paper at a set of paper disposers in which the second amount of paper is received for the account, updating the account based on the second amount of paper received.

2. The method of claim 1, wherein dispensing the first amount of paper from the set of paper dispensers comprises:
   responsive to receiving a request to dispense the first amount of paper, identifying the account associated with the request to dispense the first amount of paper;
   determining whether the first amount of paper in the request meets a set of criteria; and
   responsive to determining that the first amount of paper meets the set of criteria, dispensing the first amount of paper from the set of paper dispensers.

3. The method of claim 1, wherein updating the account based on the second amount of paper received comprises:
   identifying the account associated with the second amount of paper received.

4. The method of claim 2, wherein determining that the first amount of paper meets the set of criteria comprises determining that dispensing the first amount of paper will not result in exceeding a paper quota associated with the account.

5. The method of claim 2, wherein identifying the account associated with the request to dispense the first amount of paper comprises identifying the account based on at least one of a passcode, voice information, biometric information, photographic information, and video information.

6. The method of claim 1, wherein dispensing the first amount of paper from the set of paper dispensers and updating the account based on the first amount of paper dispensed comprises counting a first number of sheets to form the first amount of paper and updating the account based on the first number of sheets counted; and
   wherein receiving the second amount of paper at the set of paper disposers and updating the account based on the second amount of paper received comprises counting a second number of sheets of the second amount of paper and updating the account based on the second number of sheets counted.

7. The method of claim 1, wherein dispensing the first amount of paper from the set of paper dispensers and updating the account based on the first amount of paper dispensed comprises weighing a first number of sheets to form the first amount of paper and updating the account based on a first weight of the first amount of paper; and wherein receiving the second amount of paper at the set of paper disposers and updating the account based on the second amount of paper received comprises weighing the second amount of paper and updating the account based on a second weight of the second amount of paper.

8. The method of claim 1, wherein updating the account based on the first amount of paper dispensed comprises incrementing a value associated with the account by an amount corresponding to the first amount of paper dispensed; and wherein updating the account based on the second amount of paper received comprises decrementing the value associated with the account by an amount corresponding to the second amount of paper received.

9. The method of claim 1, further comprising:

storing a first value that represents a first quantity of paper dispensed for the account over a time period and storing a second value that represents a second quantity of paper received for the account over the time period; and reporting the first value and the second value.

10. The method of claim 9, further comprising:

storing at least one additional value that represents an additional quantity of paper dispensed for at least one additional account over a time period and storing at least one additional value that represents an additional quantity of paper received for the at least one additional account over the time period; and reporting a value representing a quantity of paper dispensed from the set of paper dispensers for a set of accounts over the time period and a value representing a quantity of paper received at the set of paper disposers for the set of accounts over the time period, wherein the set of accounts comprises the account and the at least one additional account.

11. The method of claim 1, wherein the dispenser is one of a printer and a copier, and wherein the disposer is one of a shredder and a bin.

* * * * *